United States Patent
Wei et al.

(10) Patent No.: US 12,075,340 B2
(45) Date of Patent: Aug. 27, 2024

(54) BASE STATIONS AND USER EQUIPMENTS CONFIGURED TO HANDLE ON-DEMAND SYSTEM INFORMATION IN 5G NR

(71) Applicant: Sony Group Corporation, Tokyo (JP)

(72) Inventors: Yuxin Wei, Basingstoke (GB); Vivek Sharma, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/139,956

(22) Filed: Apr. 27, 2023

(65) Prior Publication Data

US 2024/0089834 A1 Mar. 14, 2024

Related U.S. Application Data

(63) Continuation of application No. 17/377,394, filed on Jul. 16, 2021, now Pat. No. 11,659,477, which is a continuation of application No. 16/753,341, filed as application No. PCT/EP2018/076972 on Oct. 4, 2018, now Pat. No. 11,102,710.

(30) Foreign Application Priority Data

Oct. 5, 2017 (EP) .................................... 17195076

(51) Int. Cl.
*H04W 48/14* (2009.01)
*H04W 48/10* (2009.01)
*H04W 74/00* (2009.01)
*H04W 74/0833* (2024.01)

(52) U.S. Cl.
CPC ........... *H04W 48/14* (2013.01); *H04W 48/10* (2013.01); *H04W 74/004* (2013.01); *H04W 74/0858* (2013.01)

(58) Field of Classification Search
CPC ... H04W 48/14; H04W 48/10; H04W 74/004; H04W 74/0858; H04W 48/12; H04W 72/0486; H04W 72/044; H04W 72/0413; H04W 72/005
USPC ......................................................... 455/434
See application file for complete search history.

(56) References Cited

U.S. PATENT DOCUMENTS

| | | | | |
|---|---|---|---|---|
| 9,357,459 | B2 * | 5/2016 | Raghothaman | H04W 36/08 |
| 10,070,478 | B2 * | 9/2018 | He | H04L 5/0091 |
| 10,375,737 | B2 * | 8/2019 | Basu Mallick | H04W 72/12 |
| 10,477,340 | B2 * | 11/2019 | Edge | H04W 64/00 |
| 10,548,065 | B2 * | 1/2020 | Basu Mallick | H04W 4/06 |
| 10,743,352 | B2 * | 8/2020 | Lee | H04W 74/002 |
| 10,757,738 | B2 * | 8/2020 | Lin | H04W 72/20 |
| 10,820,352 | B2 * | 10/2020 | Ishii | H04W 74/0833 |

(Continued)

OTHER PUBLICATIONS

International Search Report and Written Opinion mailed on Jan. 31, 2019 for PCT/EP2018/076972 filed on Oct. 4, 2018, 18 pages.

(Continued)

*Primary Examiner* — Amancio Gonzalez
(74) *Attorney, Agent, or Firm* — XSENSUS LLP

(57) ABSTRACT

The present disclosure provides a user equipment for a mobile telecommunications system, which includes circuitry configured to communicate with a new radio base station. The circuitry is further configured to transmit an on-demand system information request to the new radio base station, wherein the on-demand system information request is transmitted based on a backup resource.

17 Claims, 3 Drawing Sheets

(56) References Cited

U.S. PATENT DOCUMENTS

| | | | |
|---|---|---|---|
| 10,912,011 B2 | 2/2021 | Liu et al. | |
| 11,102,710 B2 | 8/2021 | Wei et al. | |
| 11,357,059 B2 | 6/2022 | Deenoo et al. | |
| 11,659,477 B2* | 5/2023 | Wei | H04W 72/21 455/434 |
| 2018/0317263 A1* | 11/2018 | Ishii | H04W 74/0833 |
| 2019/0238270 A1* | 8/2019 | Pan | H04L 1/0067 |
| 2019/0335512 A1* | 10/2019 | Shi | H04W 74/02 |
| 2020/0022067 A1* | 1/2020 | Pan | H04B 7/0619 |
| 2020/0084694 A1* | 3/2020 | Kim | H04W 48/08 |
| 2020/0100083 A1* | 3/2020 | Lee | H04W 4/90 |
| 2020/0137554 A1* | 4/2020 | Yang | H04W 72/044 |

OTHER PUBLICATIONS

Samsung, "System Information Signalling Design in NR", 3GPP TSG-RAN WG2 Meeting #95, R2-164693, Gothenburg, Sweden, Aug. 22-26, 2016, 6 pages.

Mediatek Inc., "NR SI Request Methods", 3GPP TSG-RAN2#97Bis Meeting, R2-1702788, Spokane, US, Apr. 3-7, 2017, pp. 1-5.

Huawei and Hisilicon, "Design on MSG1 based request and failure handling", 3GPP TSG-RAN WG2 #98, R2-1705175, Hangzhou, China, May 15-19, 2017, 3 pages.

Samsung, "On Demand SI: Remaining Issues", 3GPP TSG-RAN WG2 NR#2, R2-1706527, Qingdao, China, Jun. 27-29, 2017, 8 pages.

Catt, "Remaining issues of on-demand SI", 3GPP TSG-RAN WG2 Meeting #99, R2-1707905, Berlin, Germany, Aug. 21-25, 2017, pp. 1-5.

Vivo, "Discussion on other SI request", 3GPP TSG-RAN WG2 Meeting #99bis, R2-1710943, Resubmission of R2-1708428, Prague, Czech Republic, Oct. 9-13, 2017, 5 pages.

* cited by examiner

BASE STATIONS AND USER EQUIPMENTS CONFIGURED TO HANDLE ON-DEMAND SYSTEM INFORMATION IN 5G NR

CROSS-REFERENCE TO RELATED APPLICATIONS

The present application is a continuation of U.S. application Ser. No. 17/377,394, filed Jul. 16, 2021, which is a continuation of U.S. application Ser. No. 16/753,341, filed Apr. 3, 2020 (now U.S. Pat. No. 11,102,710), which is based on PCT filing PCT/EP2018/076972, filed Oct. 4, 2018, which claims priority to EP 17195076.9, filed Oct. 5, 2017, the entire contents of each are incorporated herein by reference.

TECHNICAL FIELD

The present disclosure generally pertains to base stations and user equipments.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

As discussed, in 3GPP a work Item (WI) on New Radio Access Technology (NR) has been agreed. The new Radio Access Technology (RAT) is expected to operate in a large range of frequencies, from hundreds of MHz to 100 GHz and it is expected to cover a broad range of use cases. Use cases, which are considered, are, for example:

Enhanced Mobile Broadband (eMBB)
Massive Machine Type Communications (mMTC)
Ultra Reliable & Low Latency Communications (URLLC)

At least for initial deployment, NR and LTE are expected to coexist.

Furthermore, also RACH (Random Access Channel) procedures are expected to be deployed in NR.

Although there exist signaling techniques for LTE, it is generally desirable to improve coexisting situations between NR and LTE.

SUMMARY

According to a first aspect, the disclosure provides a user equipment for a mobile telecommunications system including circuitry configured to communicate with a new radio base station, wherein the circuitry is further configured to transmit an on-demand system information request to the new radio base station, wherein the on-demand system information request is transmitted based on a backup resource.

According to a second aspect, the disclosure provides a user equipment for a mobile telecommunications system including circuitry configured to communicate with a new radio base station, wherein the circuitry is further configured to transmit an on-demand system information request; detect scheduling information for on-demand system information transmission; and stop a re-transmission attempt of the on-demand system information request upon detection of the scheduling information.

According to a third aspect, the disclosure provides a user equipment for a mobile telecommunications system including circuitry configured to communicate with a new radio base station, wherein the circuitry is further configured to detect failure of an on-demand system information request, and record the failure in a minimization of drive test log.

According to a fourth aspect, the disclosure provides a new radio base station for a mobile telecommunications system including circuitry configured to communicate with at least one user equipment and to establish a new radio cell, wherein the circuitry is further configured to transmit on-demand system information to the at least one user equipment in response to receiving an on-demand system information request from the at least one user equipment based on a backup resource.

According to a fifth aspect, the disclosure provides a new radio base station for a mobile telecommunications system including circuitry configured to communicate with at least one user equipment and to establish a new radio cell, wherein the circuitry is further configured to monitor a reserved resource, wherein a mapping between the reserved resource and at least one system information block is predefined, and detect a collision, when a signal on the reserved resource cannot be decoded correctly.

According to a sixth aspect, the disclosure provides a new radio base station for a mobile telecommunications system including circuitry configured to communicate with at least one user equipment and to establish a new radio cell, wherein the circuitry is further configured to detect a failure of an on-demand system information request in a minimization of drive test log.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
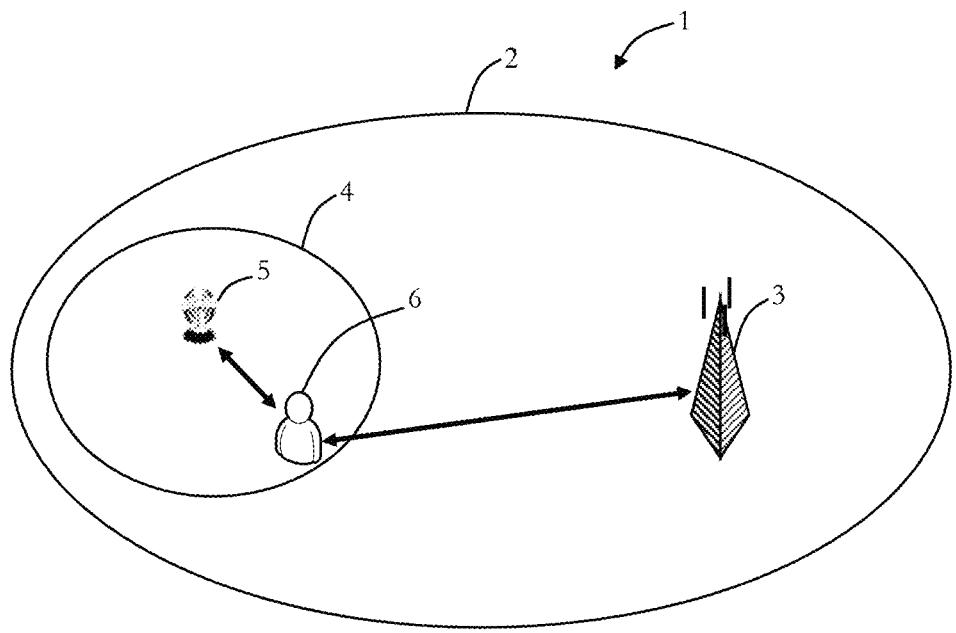
FIG. 1 illustrates an embodiment of a radio access network.

Before a detailed description of the embodiments under reference of FIG. 1 is given, general explanations are made.

As mentioned in the outset, several generations of mobile telecommunications systems are known, e.g. the third generation ("3G"), the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

As discussed, a candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

As mentioned, LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies, and there exists the successor LTE-A (LTE Advanced) allowing higher data rates than the basic LTE and which is also standardized under the control of 3GPP.

As the 5G system will be based on LTE or LTE-A, respectively, it is assumed that specific requirements of the 5G technologies and, thus, of embodiments described herein, will, basically, be dealt with by features and methods which are already defined in the LTE and LTE-A standard documentation.

As discussed, in 3GPP a work Item (WI) on New Radio Access Technology (NR) has been agreed and the new Radio Access Technology (RAT) is expected to operate in a large range of frequencies, from hundreds of MHz to 100 GHz and it is expected to cover a broad range of use cases, examples of which are given in the outset.

Moreover, as mentioned in the outset, also for the NR, RACH (Random Access Channel)-procedures will be deployed.

In some embodiments, as also illustrated in FIG. 1, NR and LTE are expected to coexist. FIG. 1 is illustrates an embodiment of a Radio Access Network RAN 1, which has a macro cell 2, which is established by a LTE (base station) eNodeB 3. Moreover, in the macro cell 2, a NR cell 4 is located, which is established by a NR (base station) eNodeB 5 (the NR eNodeB may also be referred to as NR gNB or NR gNodeB or gNB).

A (user equipment) UE 6 can communicate with the LTE eNodeB 3 and, as long it is within the NR cell 4, it can also communicate with the NR eNodeB 5. The UE 6 needs to receive system information also from the NR eNodeB 5.

Typically, in LTE the system information is broadcasted over a logical channel, e.g. BCCH (Broadcast Control Channel). Moreover, generally, the system information may have two parts, namely a static part and a dynamic part. The static part is typically called MIB (Master Information Block), which includes useful information, such as channel bandwidth, transmit power, no. of antennas, SIB (System Information Block) scheduling information and the like.

The dynamic part is typically referred to as SIB (System Information Block) including multiple subblocks. Of course, for example, the information included in the NR SI is similar to the SI as of LTE.

For the NR (new radio), in 3GPP RAN2 NR-Adhoc #2 meeting, the following agreements on system information have been reached (see also R2-1707905, 3GPP TSG-RAN WG2 Meeting #99, Berlin, Germany, 21-25 Aug. 2017, "Remaining issues of on-demand SI") for so-called Msg1 based SI request method (Msg1 is the first message sent by the UE in a RACH procedure):

RAPID is included in Msg2 (RAPID is a Random Access Preamble ID).

Fields Timing Alignment Information, UL grant and Temporary C-RNTI are not included in Msg2.

RACH procedure for SI requests is considered successful when Msg2 containing a RAPID corresponding to the transmitted preamble is received.

Msg2 reception uses RA-RNTI that corresponds to the Msg1 transmitted by the UE (details of RA-RNTI selection left to UP discussion)

UE retransmits RACH preamble according to NR RACH power ramping

Msg1 for SI request re-transmission is continued until reaching max preamble transmissions. Thereafter, a Random Access problem to upper layers is indicated. (depending on the NR RACH procedure design)

FFS: Upper layer actions when MAC reports Random Access problem. To be discussed in CP session.

Back off is applicable for Msg1 based SI requests but no special Back off subheader/procedure is required.

Figure 2:
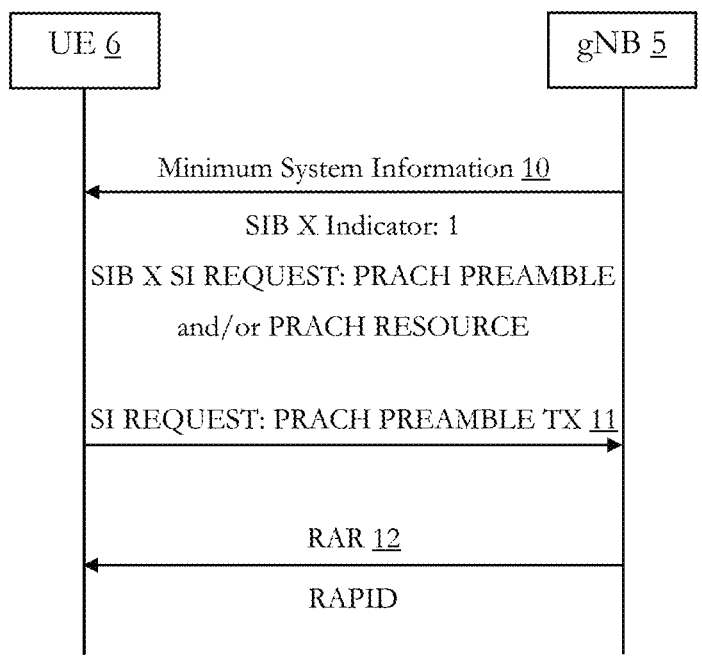
FIG. 2 illustrates Msg1 transmission.

FIG. 2 illustrates a Msg1 (message 1 or first message) procedure according to the agreements above and this is known from 3GPP document R2-1706527 (3GPP TSG-RAN WG2 NR #2, Qingdao, China, Jun. 27-29, 2016, "On Demand SI: Remaining Issues").

Here, the gNB 5 sends, at 10, a Minimum System Information (MSI) message to the UE 6 and the UE determines based on the MSI that the SIB X is provided on demand and that a SI Request needs to be transmitted by using Msg1.

Accordingly, at 11, the UE 6 sends a SI-Request including a PRACH (Physical Random Access Channel) Preamble Tx to the gNB 5.

The network, e.g., gNB 5 sends an acknowledgment in Msg2 at 12 (i.e. RAR, Random Access Response) to the UE 6, wherein the acknowledgment includes the RAPID (Random Access Preamble ID) of the UE 6.

After receipt of the acknowledgment at 11, the UE 6 monitors the SIB X window for receiving the SIB X.

However, it has been recognized that there is a situation where on demand SI (System Information) is not successfully received by the UE (user equipment), when transmitted by a NR base station (which is also referred to as gNB and may, generally, be based on the known LTE eNodeB).

According to 3GPP document R2-1707905 (3GPP TSG-RAN WG2 Meeting #99, Berlin, Germany, 21-25 Aug. 2017, "Remaining issues of on-demand SI"), actions performed by the upper layer are discussed, and four possible alternatives mentioned in this document are:

Alternative 1: UE shall treat the cell as barred.

Alternative 2: Depends on the SI/SIBs being requested. If these are not the essential SIBs, then UE refrains from retrying until a certain time. The prohibit timer, if any, might be specified or be configurable etc. In case of essential SIBs, the UE shall treat the cell as barred.

Alternative 3: Up to UE implementation—some UEs, who need certain non-essential feature-specific SIBs that are important/critical for its operation, may treat the cell as barred while other UEs may prefer to resend SI request after certain prohibit timer.

Alternative 4: Do nothing—MAC continues Msg1 transmission endlessly.

The failure of on demand SI delivery may because of e.g. the collision, or when UE cannot receive the on demand SI message, since, e.g., it is out-of-coverage.

Moreover, it has been recognized that there exist a couple collision issues for a Msg1 based SI request.

For instance, the preambles and/or PRACH resources reserved for a Msg1 based SI request will be limited. Such resource scarcity problem will become even more prominent, in some embodiments, when the resource is specific to each SIB. Thus, it is expected that there might be more collisions in Msg1 based SI request compared with Msg3 based ones. But, it has been recognized that on demand SI delivery should not be compromised only because of resources shortage and that there is a balance between SI delivery performance and resources utilization.

Furthermore, according to the legacy RACH procedure, UE will start a timer and monitor the RAR window to receive any potential respond from network. If the UE does not receive anything from the network before timer expires, typically, a retransmission with power ramping will take place. In a heavy network load situation or when the UE is, e.g., out-of-coverage, the retransmission will continue until the maximum predefined threshold is reached. It has been further recognized, while for on demand SI delivery, Msg1 is just a trigger to activate the SI broadcast, the retransmission attempts should be minimized in order to optimize the SI delivery procedure.

Consequently, some embodiments pertain to a user equipment for a mobile telecommunications system including circuitry configured to communicate with a new radio base station, wherein the circuitry is further configured to transmit an on-demand system information request to the new radio base station, wherein the on-demand system information request is transmitted based on a backup resource.

Generally, the LTE base station in the embodiments may be based on the principles of LTE (LTE-A) and the new radio (NR) base station may be based on NR RAT, as also discussed above. The LTE base station may be based on the known eNodeB of LTE, as one example, and the NR base station may be based on the discussed NR eNodeB. The user equipment may be, for example, a mobile phone, smartphone, a computer, tablet, tablet personal computer, or the like, including a mobile communication interface, or any other device which is able to perform a mobile telecommunication via, for example, LTE and/or NR, such as a hot spot device with a mobile communication interface, etc. Hence, in some embodiments, the user equipment is configured to perform communication with the NR base station and, in some embodiments, with the LTE base station simultaneously.

The backup resource may include a transmission channel/physical layer RACH time-frequency resource blocks or the like and/or it may include a reserved preamble, a number or a set of preambles.

The backup resource may be reserved in advance (e.g. by the network) or may be provided upon receipt of the on-demand system information request or may be provided upon detecting the on-demand system information request collisions. Moreover, the backup resource may only be used by the user equipment (and not by others).

The on-demand system information request may be transmitted in a Msg1 message, for instance, in order to improve the collision problem. As mentioned, in order to maximize the utilization of these backup resource(s), it/they may be activated only when the collisions are occurred and detected by the network.

The backup resource may be indicated in an essential system information transmission. The indication may also indicate when to use the backup resource (e.g. it may be a probability indication).

The on-demand system information request is transmitted over the backup resource, when it is detected that a number of transmission exceeds a predefined threshold.

The user equipment circuitry may be further configured to transmit the on-demand system information request based on an indicator received. Hence, in some embodiments, the user equipment may detect the indication of the backup resource (e.g. in the Minimum System Information or the like) and may then decide to transmit the on-demand system information request on the backup resources or not accordingly.

In some embodiments, the backup resource is only activated for predefined system information blocks.

Some embodiments, pertain to a user equipment for a mobile telecommunications system including circuitry configured to communicate with a new radio base station, wherein the circuitry is further configured to transmit an on-demand system information request; detect scheduling information for on-demand system information transmission; and stop a re-transmission attempt of the on-demand system information request upon detection of the scheduling information.

Hence, in some embodiments, instead of re-transmitting an on-demand system information request, the circuitry just detects (expected) scheduling information, since, for example, in such embodiments, the new radio base station is able to detect that there was an unsuccessful on-demand system information request and transmits in response to that scheduling information indicating the schedule of transmission of the requested on-demand system information. After the user equipment circuitry detects the expected SI scheduling information, it will stop the retransmission attempt.

In some embodiments, there is also a predefined mapping between the (backup) resource(s) and the predefined system information block(s) or sets of predefined system information block(s). In this case the reserved resource may be a backup resource as discussed herein, but can also be any other type of (pre-)reserved resource.

The user equipment circuitry may be further configured to receive a random access response for acknowledging the receipt of the on-demand system information request, wherein the random access response may include a random access preamble identification (RAPID) or the like. The RAR may transmitted by the network although in case of detection of collision, which may be detected, for example, since there is a signal using the reserved (backup) resource (e.g. preamble, or set of preambles), which cannot be decoded.

The user equipment circuitry may stop a retransmission attempt of the on-demand system information request after receipt of the random access response.

Some embodiments pertain a user equipment for a mobile telecommunications system including circuitry configured to communicate with a new radio base station, wherein the circuitry is further configured to detect failure of an on-demand system information request, and record the failure in a minimization of drive test log.

In some situations, the on-demand system information request may not be successfully transmitted, for example, in cases, where the user equipment is out-of-coverage and tries, for example, to establish or initiate D2D (device-to-device) application.

The user equipment circuitry is further configured to record the failure in a minimization of drive test log. The log can be transmitted/reported to the network (such that the failure is reported to the network) which can then, for example, perform an (correction) action, such as increase power, change parameters or setup new cell, or the like.

Some embodiments pertain to a new radio base station for a mobile telecommunications system including circuitry configured to communicate with at least one user equipment and to establish a new radio cell, wherein the circuitry is further configured to transmit on-demand system information to the at least one user equipment in response to receiving an on-demand system information request from the at least one user equipment based on a backup resource (as discussed above).

The new radio base station circuitry may be further configured to reserve the backup resource in advance, as discussed, such that, for example, the user equipment can use the backup resource for transmitting the on-demand system information request.

The new radio base station circuitry may be further configured to transmit an indication of the backup resource in an essential system information, as discussed.

The new radio base station circuitry may be further configured to detect a collision and to transmit the indication in response to detection of the collision. The collision may be detected based on a decoding error for received signals on a reserved resource. Hence, as the decoding of a received signal fails, the circuitry may conclude that a collision occurred. As mentioned, the backup resource may include reserved physical layer RACH time-frequency resources and/or preamble(s) or set of preambles which may be used by the user equipment for transmitting the on-demand system information request, such that the network can detect that a signal has been transmitted on RACH resources and/or using the preamble(s) or set of preambles.

The backup resource may only be activated (by the circuitry) for predefined system information blocks.

Some embodiments pertain to a new radio base station for a mobile telecommunications system including circuitry configured to communicate with at least one user equipment and to establish a new radio cell, wherein the circuitry is further configured to monitor a reserved resource, wherein a mapping between the reserved resource and at least one system information block is predefined, and detect a collision, when a signal on the reserved resource cannot be decoded correctly.

The resource may be a backup resource or any other type of (pre-)reserved resource.

The collision may be additionally detected, when a signal strength of the signal is above a predefined threshold.

The new radio base station circuitry may be further configured to transmit a random access response, when the collision is detected, as discussed.

The random access response may include a specific random access preamble identification, as discussed.

In some embodiments, the new radio base station circuitry may be further configured to transmit scheduling information for transmission of on-demand system information, when the collision is detected.

In some embodiments, at least one system information block of the requested on-demand system information may be transmitted, when the collision is detected.

Some embodiments pertain to a new radio base station for a mobile telecommunications system including circuitry configured to communicate with at least one user equipment and to establish a new radio cell, wherein the circuitry is further configured to detect a failure of an on-demand system information request in a minimization of drive test log.

The new radio base station circuitry may be further configured to perform at least one of: increase power (e.g. of the user equipment), change parameters and set up new cell (e.g. upon detection of the failure).

Hence, as discussed, in some embodiments, a backup resource (or multiple resources) will be reserved for Msg1 based on-demand SI request in order to improve the collision problem, while in order to maximize the utilization of these backup resources, in some embodiments, they will be activated only when the collisions are occurred and detected by the network.

Moreover, as discussed, in some embodiments, the network, e.g. NR eNodeB, will send on-demand SI once the collision is detected. In this case the network, e.g. eNodeB, successfully identified that the transmission was done using a reserved (backup resource or any other type of (pre-)reserved resource) (or set of) preamble(s) which are reserved for on-demand SI request and does not confuse with preambles used for normal RA (random access) procedure. Thus, the UE will get out of the retransmission loop by checking the SIB scheduling information, although there is no RAR received.

Furthermore, as discussed, in some embodiments, the UE logs on-demand system information RACH (random access channel) failure and reports this failure as a part of MDT (minimization of drive test) or SON-RACH procedure.

Figure 3:
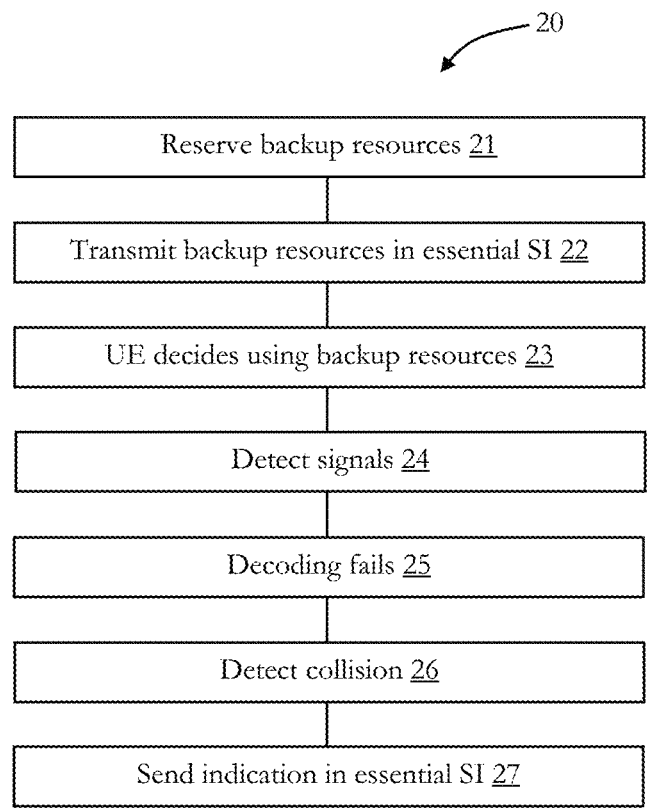
FIG. 3 illustrates an embodiment of a mobile telecommunications method.

Returning to FIG. 3, there is illustrated a first embodiment of a mobile telecommunications system method 20, which may be performed by the UE 6 and the NR eNodeB 5 (see, for example, FIG. 1). Method 20 is based on backup preambles and/or PRACH resources for Msg1 when collision occurs for an on-demand system information request transmitted from the UE 6.

At 21, the network (e.g. NR eNodeB 5) reserves at least one backup resource in advance and transmits (broadcasts) it (or an indication of it) in an essential system information at 22.

The UE will decide at 23, when to use the backup resources. For instance, the UE determines that after reaching a maximum of (or a predefined threshold less than max) preamble transmissions. As mentioned, the backup resources cannot be used by other users at any time.

Alternatively (or additionally), the network (e.g. NR eNodeB) includes at 22 a probability indicator in the essential SI (system information) to instruct the UE on how to select between the reserved and backup reserved resources.

Based, on the probability indicator, the UE then decides at 23, when to use the backup resources.

Further, alternatively (where step 23 may not be performed), the network (e.g. NR eNodeB) indicates when to use the backup resources, e.g. after detecting signals on the reserved resources at 24 and detects at 25 that it is not able to decode them (due to collision). Then, the network assumes at 26 that collision occurred. Then the network will send at 27 an indication in essential SI to activate backup resources. In this alternative embodiment, the backup resources can be used by other users before they are activated.

Moreover, in some embodiments, the network (e.g. NR eNodeB) will broadcast the backup resources in essential SI (only) when necessary. The UE will select between the reserved resources and the backup resources according to a probability indicator if any, which may be transmitted at 22, as discussed above.

Furthermore, in some embodiments, the backup resource will be configured for few important system information blocks only.

Figure 4:
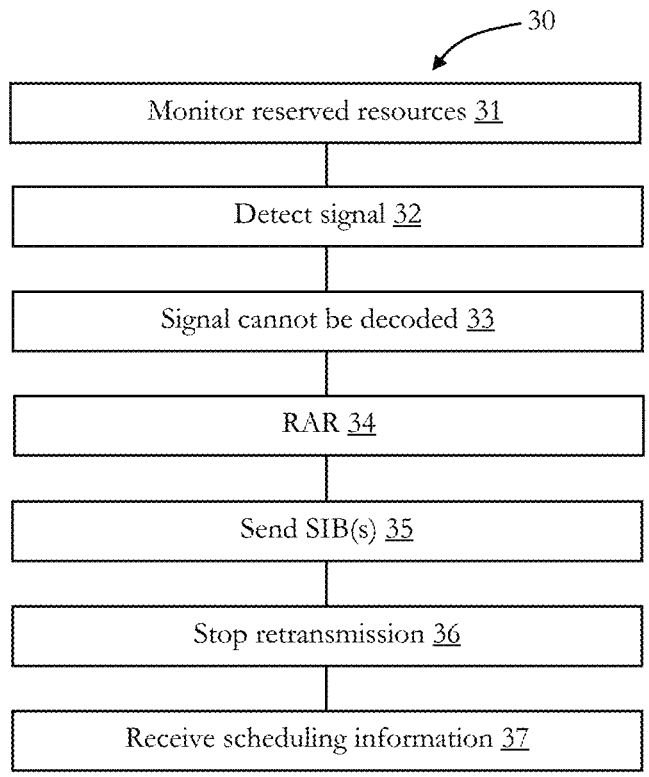
FIG. 4 illustrates another embodiment of a mobile telecommunications method.

FIG. 4 illustrates another embodiment of a mobile telecommunications system method 30, which may be performed by the UE 6 and the NR eNodeB 5 (see, for example, FIG. 1).

In this embodiment, it is assumed that there is a mapping between reserved (backup or any other type of pre-reserved) resources (preambles, PRACH resources) and a SIB (or a set of SIBs).

At 31, the network (e.g. NR eNodeB) will monitor on these resources.

If at 32 any signals are detected (and/or the signal strength is above certain threshold) on these resources, but it is detected that the signal cannot be decoded at 33, the network can deduce that there is on-going corresponding SIB(s) request from the UE.

Here, upon detection that there is an on-going request from the UE, the network (e.g. NR eNodeB) will send a random access response (RAR) with a special RAPID at 34 to indicate that corresponding SIB(s) will be broadcasted and then it will broadcast the corresponding one(s) (i.e. SIB(s)) at 35.

The UE will stop its retransmission attempts of the on-demand system information request at 36 and receives the SI scheduling information which indicates the expected SIB scheduling information at 37. Thereafter, it will receive the requested on-demand system information in accordance with the scheduling indicated in the scheduling information.

Alternatively, the network does not send the RAR (skip step 34), and the network (e.g. the NR eNodeB) just sends corresponding SIB(s) right away (as indicated in 35). The UE will check the SI scheduling information before initiating a retransmission attempt (as indicated at 37).

Figure 5:
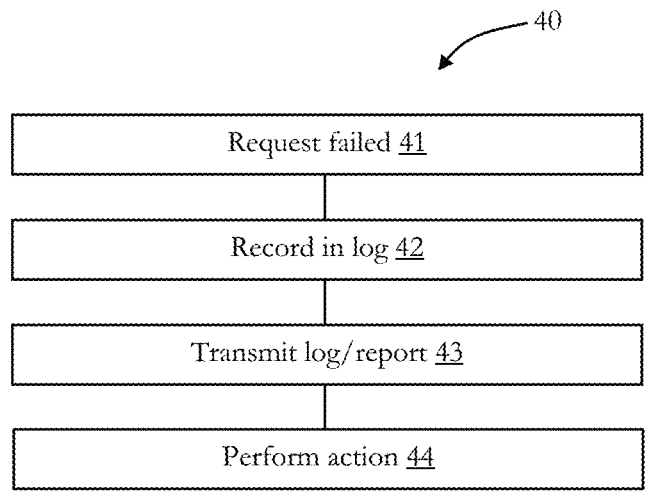
FIG. 5 illustrates another embodiment of a mobile telecommunications method.

FIG. 5 illustrates another embodiment of a mobile telecommunications system method 40, which may be performed by the UE 6 and the NR eNodeB 5 (see, for example, FIG. 1).

In this embodiment, it is assumed that, for example, the UE who is in out-of-coverage wants to initiate a D2D application (device-to-device application).

If the D2D related SI (e.g. SIB18, SIB19 in LTE) is set by the network as the on-demand SI, it could be possible that the on demand SI request attempt will be failed, as detected at 41 by the UE.

In that case, the UE may record the case into a MDT (minimization of drive test) log at 42 and sends it at 43, whereby the on-demand system information request failure is also reported.

At, 44 the network (e.g. NR eNodeB) will then have to take a corrective action, e.g. increase power, change parameters or setup new cell, etc.

Generally, The UEs may be asked to request SIB earlier than expected when the UEs are in good coverage.

This mechanism will be helpful for operators to design the network, in some embodiments.

The UE cannot distinguish between collision and unreachable preamble and will simply log the failure at 42. However, the UE knows the preamble used in this case was for an on-demand SI request.

Hence, in some embodiments, a new IE (information element) will be defined as UEInformationResponse-r9 IE. In LTE the RACH failure is already reported by the UE in an rlf-report as

```
UEInformation Response-r9-IEs ::=   SEQUENCE {
   rach-Report-r9                   SEQUENCE {
      numberOfPreamblesSent-r9         NumberOfPreamblesSent-r11,
      contentionDetected-r9            BOOLEAN
   }
```

Hence, in some embodiments the new information element is included in this message and the UE logs on-demand SI request failure by using the information element and reports it by transmitting the log at 43 to the network.

As discussed, in some embodiments, the collision problem in Msg1 based on demand SI request may be eased with backup resources while the backup resources will only be activated when necessary in some embodiments.

In some embodiments, the UE may get out of the retransmission loop in advance and could receive the on demand SI successfully although the collision happens.

Figure 6:
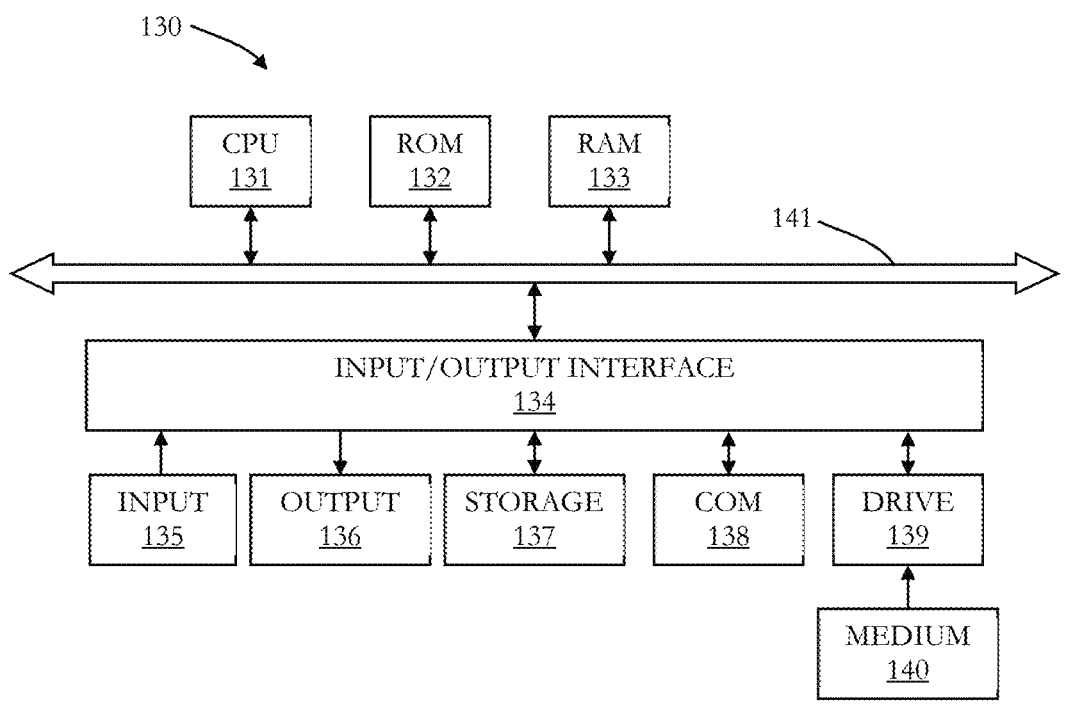
FIG. 6 illustrates a multi-purpose computer which can implement a base station or user equipment.

In the following, an embodiment of a general purpose computer 130 is described under reference of FIG. 6. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

It should be recognized that the embodiments describe methods with an exemplary ordering of method steps. The specific ordering of method steps is however given for illustrative purposes only and should not be construed as binding.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A user equipment for a mobile telecommunications system including circuitry configured to communicate with a new radio base station, wherein the circuitry is further configured to:

transmit an on-demand system information request to the new radio base station, wherein the on-demand system information request is transmitted based on a backup resource.

(2) The user equipment of (1), wherein the on-demand system information request is transmitted in a Msg1 message.

(3) The user equipment of (1) or (2), wherein the backup resource is reserved.

(4) The user equipment of anyone of (1) to (3), wherein the backup resource is indicated in an essential system information transmission.

(5) The user equipment of anyone of (1) to (4), wherein the on-demand system information request is transmitted over the backup resource, when it is detected that a number of transmissions exceeds a predefined threshold.

(6) The user equipment of anyone of (1) to (5), wherein the circuitry is further configured to transmit the on-demand system information request based on an indicator received.

(7) The user equipment of anyone of (1) to (6), wherein the backup resource is only activated for predefined system information blocks.

(8) A user equipment for a mobile telecommunications system including circuitry configured to communicate with a new radio base station, wherein the circuitry is further configured to:

transmit an on-demand system information request;

detect scheduling information for on-demand system information transmission; and stop a re-transmission attempt of the on-demand system information request upon detection of the scheduling information.

(9) The user equipment of (8), wherein the circuitry is further configured to receive a random access response and wherein the scheduling information is detected upon receipt of the random access response.

(10) A user equipment for a mobile telecommunications system including circuitry configured to communicate with a new radio base station, wherein the circuitry is further configured to:

detect failure of the on-demand system information request, and record the failure in a minimization of drive test log.

(11) The user equipment of (10), wherein the circuitry is further configured to report the failure.

(12) A new radio base station for a mobile telecommunications system including circuitry configured to communicate with at least one user equipment and to establish a new radio cell, wherein the circuitry is further configured to:

transmit on-demand system information to the at least one user equipment in response to receiving an on-demand system information request from the at least one user equipment based on a backup resource.

(13) The new radio base station of (12), wherein the circuitry is further configured to reserve the backup resource in advance.

(14) The new radio base station of (12) or (13), wherein the circuitry is further configured to transmit an indication of the backup resource in an essential system information.

(15) The new radio base station of (14), wherein the circuitry is further configured to detect a collision and to transmit the indication in response to detection of the collision.

(16) The new radio base station of (15), wherein the collision is detected based on a decoding error for received signals on a reserved resource.

(17) The new radio base station of (16), wherein the reserved resource is at least one of the backup resource and a pre-reserved resource.

(18) The new radio base station of anyone of (12) to (17), wherein the backup resource is only activated for predefined system information blocks.

(19) A new radio base station for a mobile telecommunications system including circuitry configured to communicate with at least one user equipment and to establish a new radio cell, wherein the circuitry is further configured to:
monitor a reserved resource, wherein a mapping between the reserved resource and at least one system information block is predefined, and
detect a collision, when a signal on the reserved resource cannot be decoded correctly.

(20) The new radio base station of (19), wherein the collision is additionally detected, when a signal strength of the signal is above a predefined threshold.

(21) The new radio base station of (19) or (20), wherein the circuitry is further configured to transmit a random access response, when the collision is detected.

(22) The new radio base station of (21), wherein the random access response includes a random access preamble identification.

(23) The new radio base station of anyone of (19) to (22), wherein at least one system information block of the requested on-demand system information is transmitted, when the collision is detected.

(24) A new radio base station for a mobile telecommunications system including circuitry configured to communicate with at least one user equipment and to establish a new radio cell, wherein the circuitry is further configured to:
detect a failure of an on-demand system information request in a minimization of drive test log.

(25) The new radio base station of (24), wherein the circuitry is further configured to perform at least one of: increase power, change parameters and set up new cell.

The invention claimed is:

1. A user equipment for a mobile telecommunications system comprising circuitry configured to communicate with a new radio base station, wherein the circuitry is further configured to:
transmit an on-demand system information request to the new radio base station, wherein the on-demand system information request is transmitted on a resource, wherein
the resource includes a random access preamble.

2. The user equipment of claim 1, wherein
the on-demand system information request is transmitted in a Msg1 message.

3. The user equipment of claim 1, wherein
the resource includes a random access time resource.

4. The user equipment of claim 3, wherein
the resource is reserved.

5. The user equipment of claim 4, wherein
the resource is indicated in an essential system information transmission.

6. The user equipment of claim 1, wherein
the on-demand system information request is transmitted over the resource, when it is detected that a number of transmissions exceeds a predefined threshold.

7. The user equipment of claim 1, wherein
the circuitry is further configured to transmit the on-demand system information request based on an indicator received.

8. The user equipment of claim 1, wherein
the resource is only activated for predefined system information blocks.

9. A new radio base station for a mobile telecommunications system comprising circuitry configured to communicate with at least one user equipment and to establish a new radio cell, wherein the circuitry is further configured to:
transmit on-demand system information to the at least one user equipment in response to receiving an on-demand system information request from the at least one user equipment on a resource, wherein
the resource includes a random access preamble.

10. The new radio base station of claim 9, wherein
the on-demand system information request is transmitted in a Msg1 message.

11. The new radio base station of claim 10, wherein
the resource includes a random access time resource.

12. The new radio base station of claim 11, wherein
the circuitry is further configured to reserve the resource in advance.

13. The new radio base station of claim 12, wherein
the circuitry is further configured to transmit an indication of the resource in an essential system information.

14. The new radio base station of claim 13, wherein
the circuitry is further configured to detect a collision and to transmit the indication in response to detection of the collision.

15. The new radio base station of claim 14, wherein
the collision is detected based on a decoding error for received signals on a reserved resource.

16. The new radio base station of claim 15, wherein
the reserved resource is at least one of the resource and a pre-reserved resource.

17. The new radio base station of claim 9, wherein
the resource is only activated for predefined system information blocks.

* * * * *